(12) United States Patent
Dalena

(10) Patent No.: US 10,804,802 B2
(45) Date of Patent: Oct. 13, 2020

(54) DIRECT CHARGING WITH MUTUAL ACTIVE CLAMP

(71) Applicant: Dialog Semiconductor (UK) Limited, London (GB)

(72) Inventor: Francesco Dalena, Leghorn (IT)

(73) Assignee: Dialog Semiconductor (UK) Limited, London (GB)

( * ) Notice: Subject to any disclaimer, the term of this patent is extended or adjusted under 35 U.S.C. 154(b) by 43 days.

(21) Appl. No.: 16/163,928

(22) Filed: Oct. 18, 2018

(65) Prior Publication Data

US 2019/0123649 A1 Apr. 25, 2019

(30) Foreign Application Priority Data

Oct. 24, 2017 (DE) .................. 10 2017 219 010

(51) Int. Cl.
| | |
|---|---|
| *H02M 3/158* | (2006.01) |
| *H02M 3/156* | (2006.01) |
| *H02J 7/00* | (2006.01) |

(52) U.S. Cl.
CPC ............ *H02M 3/1582* (2013.01); *H02J 7/00* (2013.01); *H02J 7/0072* (2013.01);
(Continued)

(58) Field of Classification Search
USPC .......................................................... 320/140
See application file for complete search history.

(56) References Cited

U.S. PATENT DOCUMENTS

| | | |
|---|---|---|
| 2010/0156368 A1 | 6/2010 | Huynh et al. |
| 2013/0038301 A1 | 2/2013 | Ouyang et al. |

(Continued)

FOREIGN PATENT DOCUMENTS

DE  10 2006 009 956   9/2007

OTHER PUBLICATIONS

German Office Action, Reference No. 10 2017 219 010.8, Applicant: Dialog Semiconductor (UK) Limited, 6 pgs, and English translation, 8 pgs.

*Primary Examiner* — Mohammed Alam
(74) *Attorney, Agent, or Firm* — Saile Ackerman LLC; Stephen B. Ackerman

(57) ABSTRACT

A power converter comprises a high side switching element and a low side switching element arranged in series between an input terminal of the power converter and a reference terminal. A first feedback circuit of the power converter is configured to control an output voltage or an output current at an output terminal of the power converter. The first feedback circuit comprises a first comparator configured to generate a first control signal for controlling the switching of the switching elements by comparing a first error voltage with a first ramp signal. A second feedback circuit of the power converter is also configured to control said output voltage or said output current. The second feedback circuit comprises a second comparator configured to generate a second control signal by comparing a second error voltage with a second ramp signal. A selective clamping unit is configured to determine if the first error voltage is larger than the second error voltage, and to reduce the first error voltage if it is determined that the first error voltage is larger than the second error voltage.

16 Claims, 11 Drawing Sheets

(52) U.S. Cl.
CPC ......... *H02M 3/156* (2013.01); *H02J 2207/20* (2020.01); *H02M 2003/1566* (2013.01)

(56) References Cited

U.S. PATENT DOCUMENTS

| | | | |
|---|---|---|---|
| 2014/0043877 A1* | 2/2014 | Ishii | H02M 1/4225 363/84 |
| 2016/0087530 A1* | 3/2016 | Gambetta | H02M 3/158 323/271 |
| 2017/0040898 A1 | 2/2017 | Hong et al. | |
| 2019/0123649 A1* | 4/2019 | Dalena | H02M 3/156 |

* cited by examiner

DIRECT CHARGING WITH MUTUAL ACTIVE CLAMP

TECHNICAL FIELD

The present document relates to power converters with two or more feedback circuits. In particular, the present document relates to a DC/DC power converter for charging an energy storage device, wherein the DC/DC power converter comprises at least a current control loop and a voltage control loop.

BACKGROUND

Mobile electronic devices, such as e.g. smartphones, tablets or laptop computers, are typically powered by rechargeable batteries. Depending on the type and the size of the batteries, well-defined currents and voltages have to be provided to the battery by a battery charging circuit (in the following denoted as charger) in order to minimize the charging time and/or maximize the lifetime of the battery.

The classical way to design the charger is the power path architecture. In the power path architecture, a DC/DC converter is followed by a linear charger, in order to implement the current control loop and voltage control loop for the battery. A new way to implement the battery charger is the direct charge architecture in which all control loops are implemented into the DC/DC converter and the linear charger is omitted. The main issue with this direct charge architecture is that all the loops work together in the DC/DC converter. Such a DC/DC converter may e.g. comprise three control loops: a first voltage control loop for adapting the input voltage to the output voltage, a current control loop used to impose an accurate current on the battery in a first phase of charging, and a second voltage control loop used to impose an accurate voltage on the battery in a later, second phase of charging. Every control loop is implemented using a dedicated feedback circuit, and at a certain instance of time, one control loop may be dominating the behavior of the charger. However, during transition from one dominating control loop to another, a substantial time delay may occur. The reason for this delay is that the non-dominating control loops tend to saturate e.g. towards a supply voltage, when the dominating control loop is in charge of controlling the output current or the output voltage of the power converter. As a result, the output currents and/or voltages of the battery charger may show undesired discontinuity in form of overshoots during the transitions.

SUMMARY

The present document addresses the above-mentioned technical problems. In particular, the present document addresses the technical problem of providing an efficient power converter with at least two control loops and an improved switching/transitioning between the control loops. In addition, it is desirable to achieve smooth output currents/voltages at the output of the power converter.

According to an aspect, a power converter comprises a high side switching element and a low side switching element, arranged in series between an input terminal of the power converter and a reference terminal, which may be e.g. a ground terminal. The power converter may be e.g. a DC/DC power converter. In particular, the power converter may be a buck converter. Each of the two switching elements can be implemented with any suitable device, such as, for example, a metal-oxide-semiconductor field effect transistor (MOSFET), an insulated-gate bipolar transistor IGBT, a MOS-gated thyristor, or any other suitable power device. Each switching element has a gate to which a respective driving voltage or control signal may be applied to turn the switching element on or off.

A first feedback circuit of the power converter is configured to control an output voltage or an output current at an output terminal of the power converter. The first feedback circuit (i.e. a first control loop) comprises a first comparator configured to generate a first control signal for controlling the switching of the switching elements by comparing a first error voltage with a first ramp signal. A second feedback circuit (i.e. a second control loop) of the power converter is also configured to control the output voltage or the output current. The second feedback circuit comprises a second comparator configured to generate a second control signal by comparing a second error voltage with a second ramp signal. A selective clamping unit is configured to determine if the first error voltage is larger than the second error voltage, and to reduce the first error voltage if it is determined that the first error voltage is larger than the second error voltage.

More specifically, the selective clamping unit may be configured to reduce the first error voltage only if it is determined that the first error voltage is larger than the second error voltage. The other way round, the selective clamping unit may be configured to reduce the second error voltage, if it is determined that the first error voltage is smaller than the second error voltage. In general, in case the power converter comprises 3 or more feedback circuits, the selective clamping unit may be configured to determine the minimum error voltage among the set of error voltages, and may be configured to reduce all error voltages except the minimum error voltage. By determining those error voltages, which are larger than the minimum error voltage, the selective clamping unit determines the non-dominant feedback circuits. While only the feedback circuit with the minimum error voltage may be dominantly controlling the output voltage or the output current of the power converter, the non-dominant feedback circuits may saturate, and the respective error voltages may drift towards the supply voltage $V_{DD}$, or to another reference potential such as e.g. ground. Due to this saturation effect, the time required for transitioning from one dominant feedback circuit to another dominant feedback circuit may be substantially increased. By identifying the non-dominant feedback circuits at a certain point in time and reducing the error voltages of the non-dominant feedback circuits, saturation of the non-dominant feedback circuits may be prevented, and recovery of the error voltage is accelerated in case a non-dominant feedback circuit is activated.

Moreover, the selective clamping unit may be configured to reduce the first error voltage if a voltage difference between the first error voltage and the second error voltage exceeds a predetermined threshold voltage. Preferably, the selective clamping unit may be configured to reduce the first error voltage, only if the voltage difference between the first error voltage and the second error voltage exceeds the predetermined threshold voltage. The selective clamping unit may be configured to not influence the first error voltage, if the voltage difference does not exceed the predetermined threshold value. Thus, it becomes possible to selectively clamp the first error voltage of a non-dominating feedback circuit to a voltage level, which does not exceed the second error voltage by the predetermined threshold voltage. As a result, the maximum time that the first feedback circuit requires for transitioning from a non-dominating state to a dominating state may be limited, and an upper bound for this transition time may be specified, wherein the upper bound directly relates to the predetermined threshold voltage of the selective clamping unit. Of course, the closer the first error voltage is clamped to the second error voltage, the faster the transitioning may eventually take place.

For example, the first feedback circuit may be configured to control the output voltage and the second feedback circuit may be configured to control the output current. Alternatively, both the first feedback circuit and the second feedback circuit may be configured to control the output voltage, e.g. based on different constraints. The latter constraints may be e.g. dependent on a charging schedule, and ultimately on the charging state of a battery, which may be charged using the described power converter. For example, the first feedback circuit may be configured to control the output current during a first time interval, and the second feedback circuit may be configured to control the output voltage during a subsequent, second time interval.

The first ramp signal and the second ramp signal may be generated by the same ramp signal generator. The ramp signal generator, which may not necessarily form part of the described power converter, may e.g. periodically output a ramp voltage that repeatedly rises in accordance with a positive ramp slope, until a given upper ramp voltage level is reached, and subsequently falls in accordance with a negative ramp slope, until a given lower ramp voltage level is reached. Any of the positive ramp slope, the negative ramp slope, the upper ramp voltage level, orand the lower ramp voltage level may be variable. Moreover, the first and the second ramp signals may have a more complex, piece-wise linear shape, comprising two or more positive ramp slopes and/or two or more negative ramp slopes. For instance, the ramp signal generator may be configured to generate the first and the second ramp signal, based on a voltage at an intermediate node connecting the high side switching element and the low side switching element. In the following description, for the sake of simpler presentation and without loss of generality, it will be assumed that the first and the second ramp signals are identical.

In general, the comparators may be configured to compare two analog or digital input signals, and to output a binary output signal indicating the result of the comparison, i.e. indicating which of the two input signals has the larger signal value. In the present case, the comparators are configured to compare the respective error voltages with the corresponding ramp signals, i.e. two analog voltage signals. The control signals generated at the outputs of both comparators represent binary output signals.

The first and the second control signals may then be used to control the switching behavior of the switching elements. For instance, when the first error voltage crosses the ramp signal, the high side switching element may be turned off and the low side switching element may be turned on. Analogously, when the second error voltage crosses the ramp signal, the high side switching element may be turned off and the low side switching element may be turned on. Depending on whether the first error voltage or the second error voltage crosses the ramp signal first, it will be the first error voltage or the second error voltage which actively controls the output voltage or the output current of the power converter. Thus, either the first or the second feedback circuit may be the dominating loop.

In order to control the switching of the switching elements, the power converter may further comprise a control circuit configured to generate a combined control signal, for controlling the switching of the switching elements based on the second error voltage, when the first error voltage is larger than the second error voltage.

Specifically, the control circuit may be configured to determine that the first error voltage is larger than the second error voltage, and to generate the combined control signal on the second error voltage, when it is determined that the first error voltage is larger than the second error voltage. The other way round, the control circuit may be configured to generate the combined control signal for controlling the switching of the switching elements, based on the first error voltage in times when the first error voltage is smaller than the second error voltage. In general, in case of more than two feedback circuits, the control circuit may be configured to determine the minimum error voltage among all error voltages, and generate the combined control signal for controlling the switching elements based on this minimum error voltage.

For this purpose, the control circuit may comprise a logic gate configured to generate the combined control signal, based on the first control signal and the second control signal. The switching of the switching elements may then be directly controlled based on the combined control signal. In particular, the logic gate may be an AND-gate configured to generate the combined control signal by determining a logical conjunction based on the first control signal and the second control signal.

The described control circuit ensures that the feedback circuit with the minimum error voltage is dominating, i.e. the feedback circuit with the minimum error voltage is actively regulating the output voltage or the output current of the power converter. The remaining feedback circuits are regarded as non-dominating feedback circuits. As already described in the forgoing description, without being clamped to a certain voltage level by the selective clamping unit, the error voltages of the non-dominating feedback circuits would saturate e.g. towards the supply voltage.

The first feedback circuit may comprise a first error amplifier configured to generate the first error voltage, by amplifying a difference between a first reference voltage and a first feedback voltage from the output of the power converter. Similarly, the second feedback circuit may comprise a second error amplifier configured to generate the second error voltage, by amplifying a difference between a second reference voltage and a second feedback voltage from the output of the power converter. For example, the first error amplifier or the second error amplifier may be implemented using an operational transconductance amplifier OTA. Optionally, in case the OTAs are used as error amplifiers, the feedback circuits may comprise further resistances or capacitors between the error amplifiers and the comparators, to translate the output currents generated by the OTAs into corresponding error voltages at the inputs of the comparators. The feedback voltages may be based on a voltage at the output terminal of the power converter, or based on the voltage at the intermediate node connecting the high side switching element and the low side switching element.

According to another aspect, a method for operating a power converter with a high side switching element and a low side switching element arranged in series between an input terminal of the power converter and a reference terminal is presented. The method comprises at least the following three steps: Firstly, a first control signal is generated for controlling the switching of the switching elements by comparing a first error voltage with a first ramp signal. Secondly, a second control signal is generated for controlling the switching of the switching elements by comparing a second error voltage with a second ramp signal. And thirdly, it is determined if the first error voltage is larger than the second error voltage, the first error voltage is reduced, if it is determined that the first error voltage is larger than the second error voltage.

The method may further comprise reducing the first error if a voltage difference between the first error voltage and the second error voltage exceeds a predetermined threshold voltage. In addition, a control circuit may generate a combined control signal for controlling the switching of the switching element based on the second error voltage, when the first error voltage is larger than the second error voltage. Specifically, the control circuit may determine that the first error voltage is larger than the second error voltage, and the control circuit may generate the combined control signal for controlling the switching of the switching element based on the second error voltage, when it is determined that the first error voltage is larger than the second error voltage. To this end, a logic gate may be provided within the control circuit, and this logic gate may generate the combined control signal based on the first control signal and based on the second control signal. More specifically, the logic gate may be an AND-gate. Put in a different way, the logic gate determines the combined control signal by performing a logical AND-operation on the first control signal and on the second control signal.

Moreover, the method may further comprise providing, as part of the first feedback circuit, a first error amplifier, and generating, by the first error amplifier, the first error voltage by amplifying a difference between a first reference voltage and a first feedback voltage from the output of the power converter. As part of the second feedback circuit, a second error amplifier may be provided, and this second error amplifier may generate the second error voltage by amplifying a difference between a second reference voltage and a second feedback voltage from the output of the power converter.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DETAILED DESCRIPTION

Figure 1:
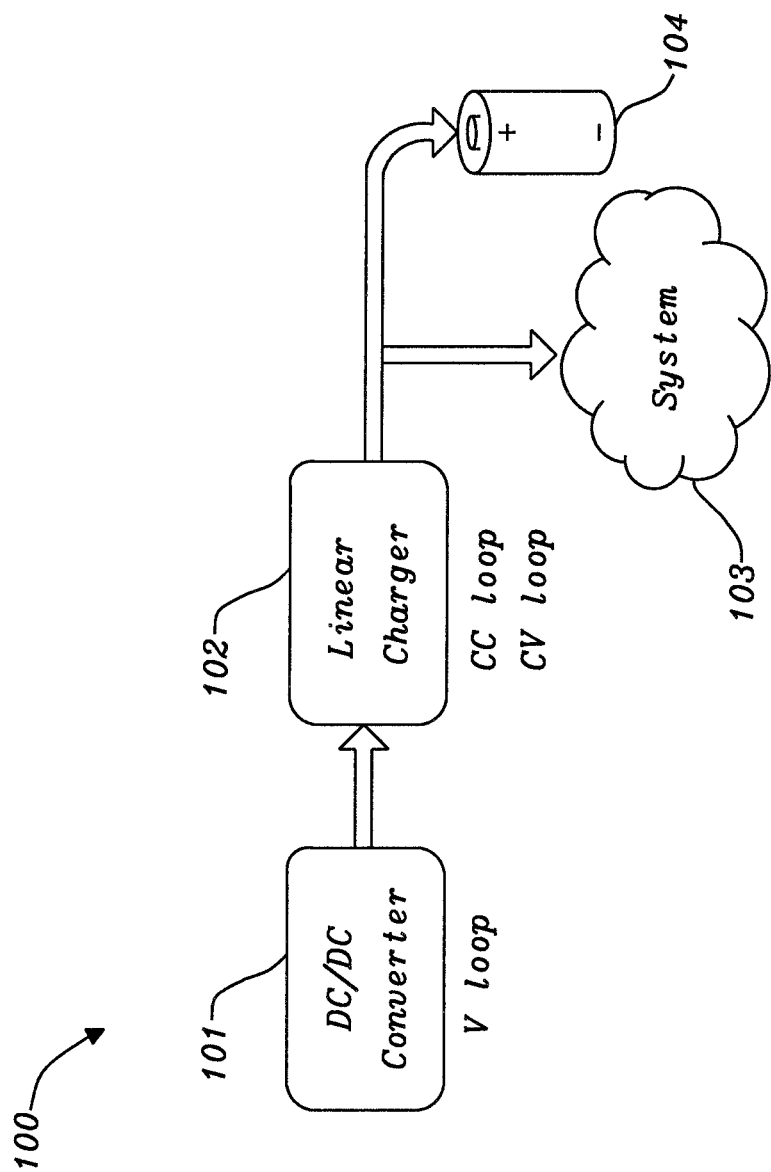
FIG. 1 shows a power path architecture comprising a DC/DC converter and a linear charger.

FIG. 1 shows an example for a classical power path architecture 100 that is used to charge an energy storage device 104 (e.g. battery) and to provide a supply current to a system 103 (e.g. a smartphone, tablet, or a portable device). In power path architecture 100, a DC/DC converter 101 is used to convert an input voltage to the voltage required to charge the battery 104, while a linear charger 102 imposes a certain accuracy of the current and voltage loop to follow the charge profile of the battery. The DC/DC converter 101 comprises a feedback loop for controlling the output voltage (V loop), and the linear charger 102 comprises both a feedback loop for controlling the output voltage (CV loop), and a feedback loop for controlling the output current (CC loop). The DC/DC converter 101 needs to set-up a voltage slightly exceeding the one needed to charge the battery 104, in order to give enough headroom to the linear charger 102. This is a limitation in this kind of architecture in terms of efficiency.

The classical power path architecture 100 may have e.g. a buck converter as DC/DC converter 101 in series with the linear charger 102 that regulates voltage and current into the battery. In this case, the buck converter may act as a simple step down converter, in order to accommodate the input voltage to one suitable to charge the battery. The voltage and current loop are implemented via linear charger 102, which may be implemented e.g. as low-dropout LDO regulator. In this scenario, since the pass device of the LDO may operate in the saturation region, there may be a considerable amount of power loss in the linear charger 102 itself, since it has to regulate the voltage/current.

Figure 2:
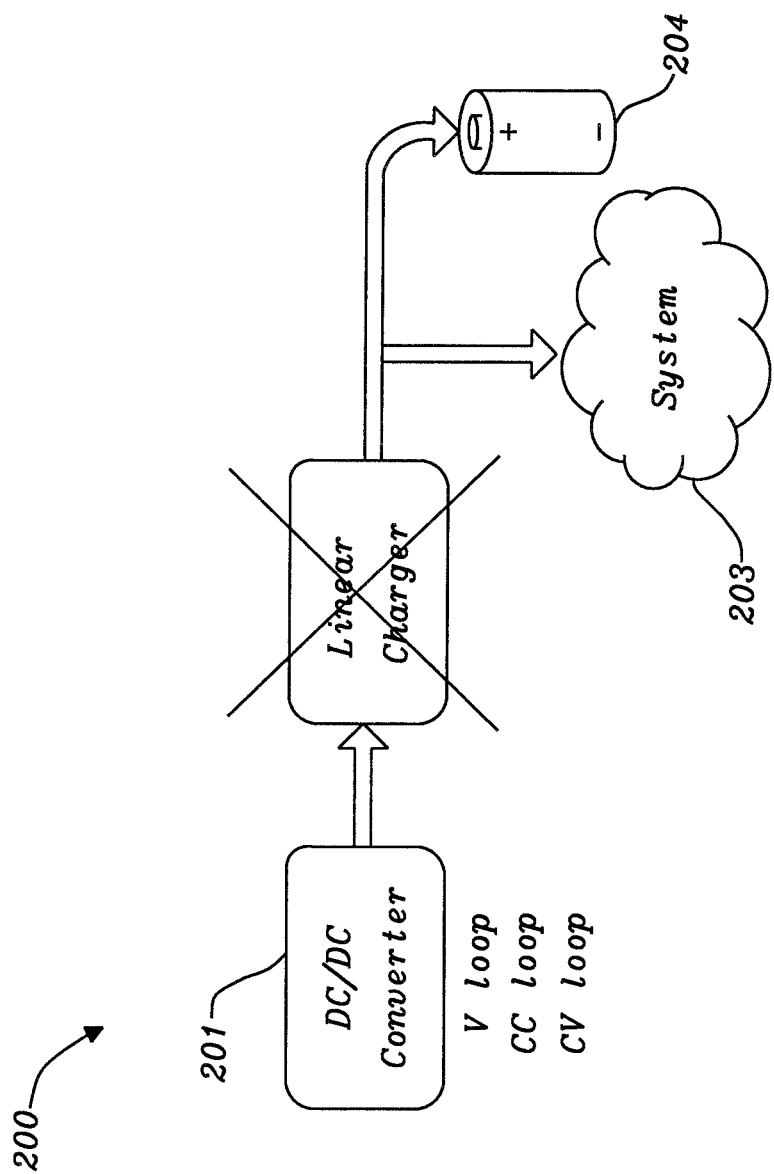
FIG. 2 shows a direct charging architecture comprising a DC/DC converter.

A possible solution to this problem is depicted in FIG. 2, where an example for a so-called direct charging architecture 200 is illustrated. In the direct charging architecture 200, the linear charger is removed, and all the loops (V loop, CV loop, and CC loop) are embedded into the DC/DC converter 201. In the case of the direct charging architecture 200, there may be a simple power switch between the DC/DC converter 201 and the system 203 and/or the energy storage device 204. In this case, the power loss is minimal, since when the switch is on it is completely on, and the voltage drop on the transistor implementing the switch (e.g. a MOSFET) is the product of resistance of this switch in the ON-state and the current through the switch.

In FIG. 2, the main loops implemented in the DC/DC converter 201 may be: a voltage loop (V loop) used to adapt the input voltage to the output voltage, the CC loop used to impose an accurate current to the battery e.g. in the first phase of the charging process, and the CV loop used to impose an accurate voltage to the battery e.g. in the second phase of the charging process.

The main differences between the two architectures may be summarized as follows: In the power path architecture 100, the DC/DC converter 101 regulates at a fixed overhead dictated by a maximum requested charging current requirement, while a local linear loop regulates the battery current. In the direct charging architecture 200, the DC/DC converter 201 regulates at a variable overhead dictated by the actual charging current and the pass resistance of the optional power switch described above. Therefore, in the direct charging architecture 200, the DC/DC converter 201 always works at the minimum possible overhead.

Figure 3:
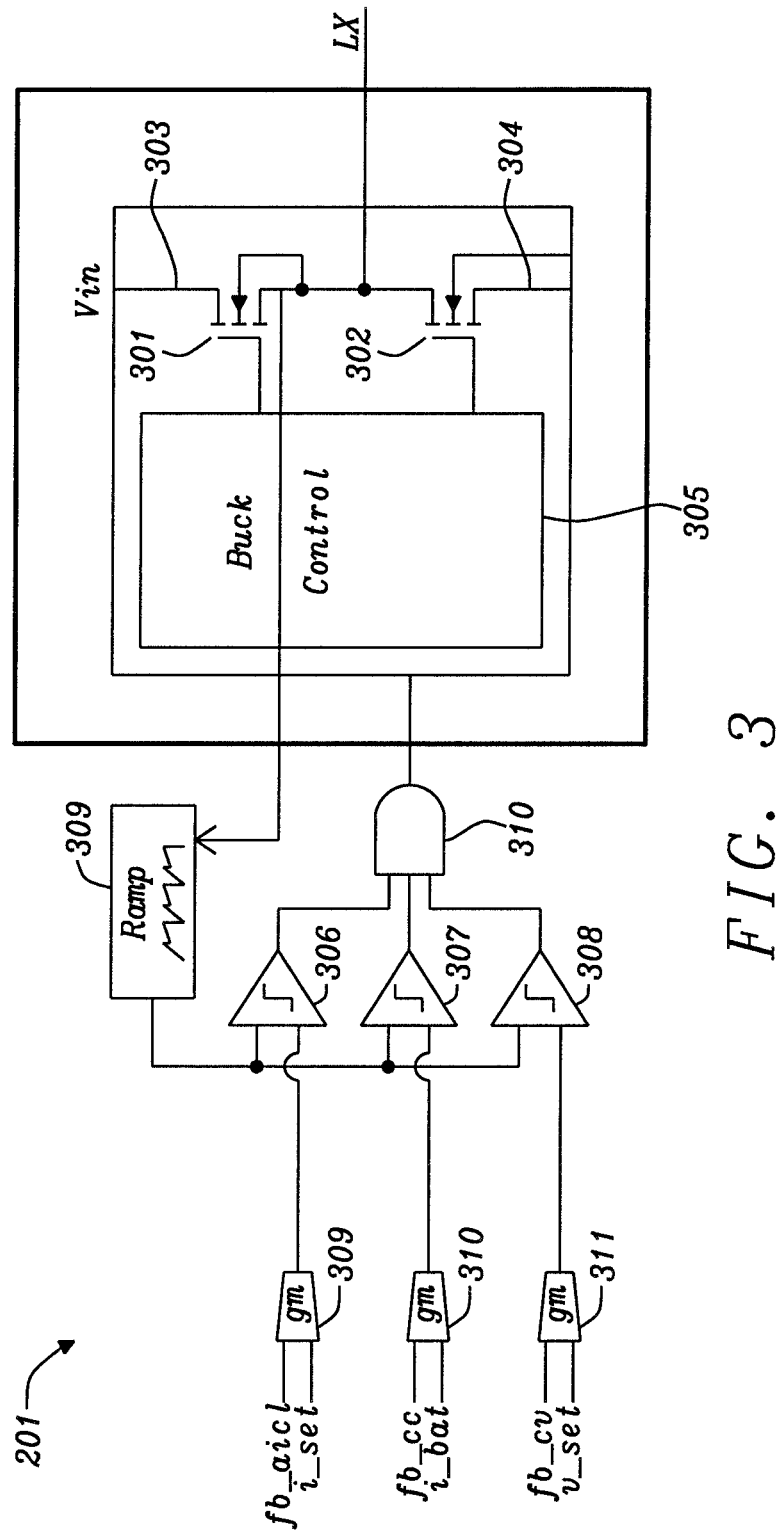
FIG. 3 shows an exemplary circuit diagram of a DC/DC converter.

FIG. 3 shows an exemplary circuit diagram of a DC/DC converter 201, which may be used in the direct charging architecture 200 depicted in FIG. 2. The DC/DC converter 201 comprises a high side switching element 301 and a low side switching element 302, arranged in series between an input terminal 303 of DC/DC converter 201 and a reference terminal 304, which may be e.g. a ground terminal. The voltage at the input terminal 303 of the DC/DC converter 201 is denoted as Vin. For instance, DC/DC converter 201 may be a buck converter. As such, control block 305 comprises control logic for generating the drive signals, which are supplied to the gates of switching elements 301 and 302.

A first feedback circuit of the DC/DC converter 201 is configured to control an output current at an output terminal (not shown) of the DC/DC converter 201. This first feedback circuit comprises a first comparator 306 configured to generate a first control signal for controlling the switching of the switching elements 301, 302 by comparing a first error voltage with a ramp signal generated by ramp generator 309. The first error voltage is based on an error signal generated by a first error amplifier 313, which is configured to amplify a voltage difference between a first reference voltage (denoted as i_set in FIG. 3) and a first feedback voltage (denoted as fb_aicl in FIG. 3). The first feedback voltage may be derived directly or indirectly from the output current at the output terminal of the DC/DC converter 201.

Analogously, a second feedback circuit of the DC/DC converter 201 is configured to control the output current at the output terminal. This second feedback circuit comprises a second comparator 307 configured to generate a second control signal for controlling the switching of the switching elements 301, 302 by comparing a second error voltage with the ramp signal generated by ramp generator 309. The second error voltage is based on an error signal generated by a second error amplifier 312, which is configured to amplify a voltage difference between a second reference voltage (denoted as i_bat in FIG. 3) and a second feedback voltage (denoted as fb_cc in FIG. 3). Again, the second feedback voltage may be derived directly or indirectly from the output current at the output terminal of the DC/DC converter 201.

Finally, a third feedback circuit of the DC/DC converter 201 is configured to control an output voltage at the output terminal. This third feedback circuit comprises a third comparator 308 configured to generate a third control signal for controlling the switching of the switching elements 301, 302 by comparing a third error voltage with the ramp signal generated by ramp generator 309. In the depicted example circuit, all three comparators 306, 307, 308 receive the same ramp signal generated by ramp generator 309. The ramp signal may be typically composed of a compensation ramp portion and a current feedback portion. The third error voltage is based on an error signal generated by a third error amplifier 311, which is configured to amplify a voltage difference between a third reference voltage (denoted as v_set in FIG. 3) and a third feedback voltage (denoted as fb_cv in FIG. 3). The third feedback voltage may be derived directly or indirectly from the output voltage at the output terminal of the DC/DC converter 201.

As can be seen in FIG. 3, the three control signals generated by the three comparators 306, 307, 308 are provided to the input of logic gate 310, which is an AND-gate in the chosen exemplary implementation of DC/DC converter 201. For example, the first control signal, which goes to zero lets the output of the AND-gate switch to zero, too. The output of the AND-gate is then propagated to control block 305. For the example in which the output of the AND-gate switches to zero, such an output signal of the AND-gate may turn off the high side switching element 301, and turn on the low side switching element 302.

Figure 4:
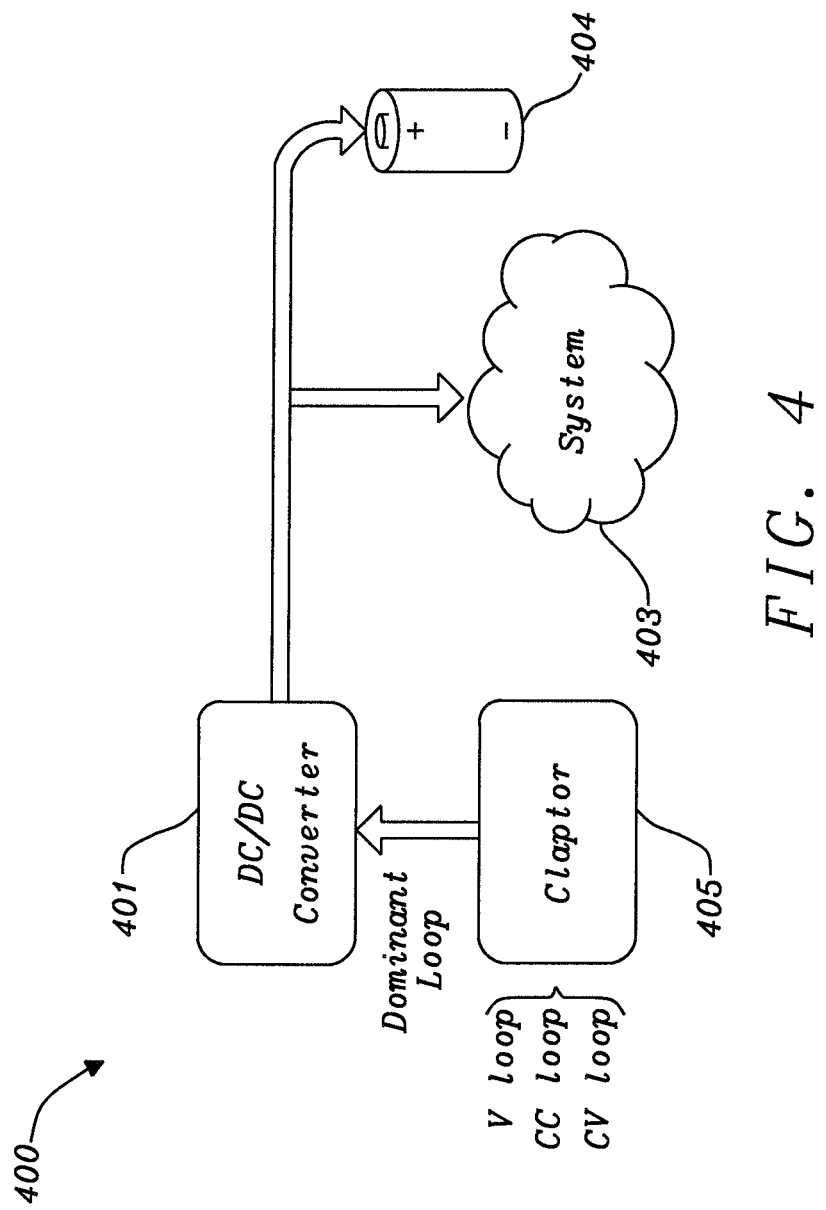
FIG. 4 shows an exemplary direct charging architecture with a selective clamping unit.

FIG. 4 shows an exemplary direct charging architecture 400 comprising a DC/DC converter 401 supplying electrical power to both a system 403 and an energy storage device 404. This time, however, the direct charging architecture 400 comprises a selective clamping unit 405 (denoted as Claptor in FIG. 4). It should be mentioned that, although the selective clamping unit 405 is shown as a unit external to the DC/DC converter 401 in FIG. 4, selective clamping unit 405 may be integrated into the DC/DC converter 401. As will be discussed in detail below, the selective clamping unit 405 is configured to determine the error voltage with the minimum voltage value among the three error voltages in the DC/DC converter 401, and to reduce the other two error voltages (having voltage values higher than the minimum voltage value) in order to reduce the voltage difference between the error voltage in the dominant feedback loop (i.e. the feedback loop exhibiting the minimum error voltage) and the error voltages in the two non-dominant feedback loops. In this way, the time required for a non-dominant feedback loop to settle is reduced when the DC/DC converter 401 transitions from the currently dominant feedback loop to this non-dominant feedback loop.

Figure 5:
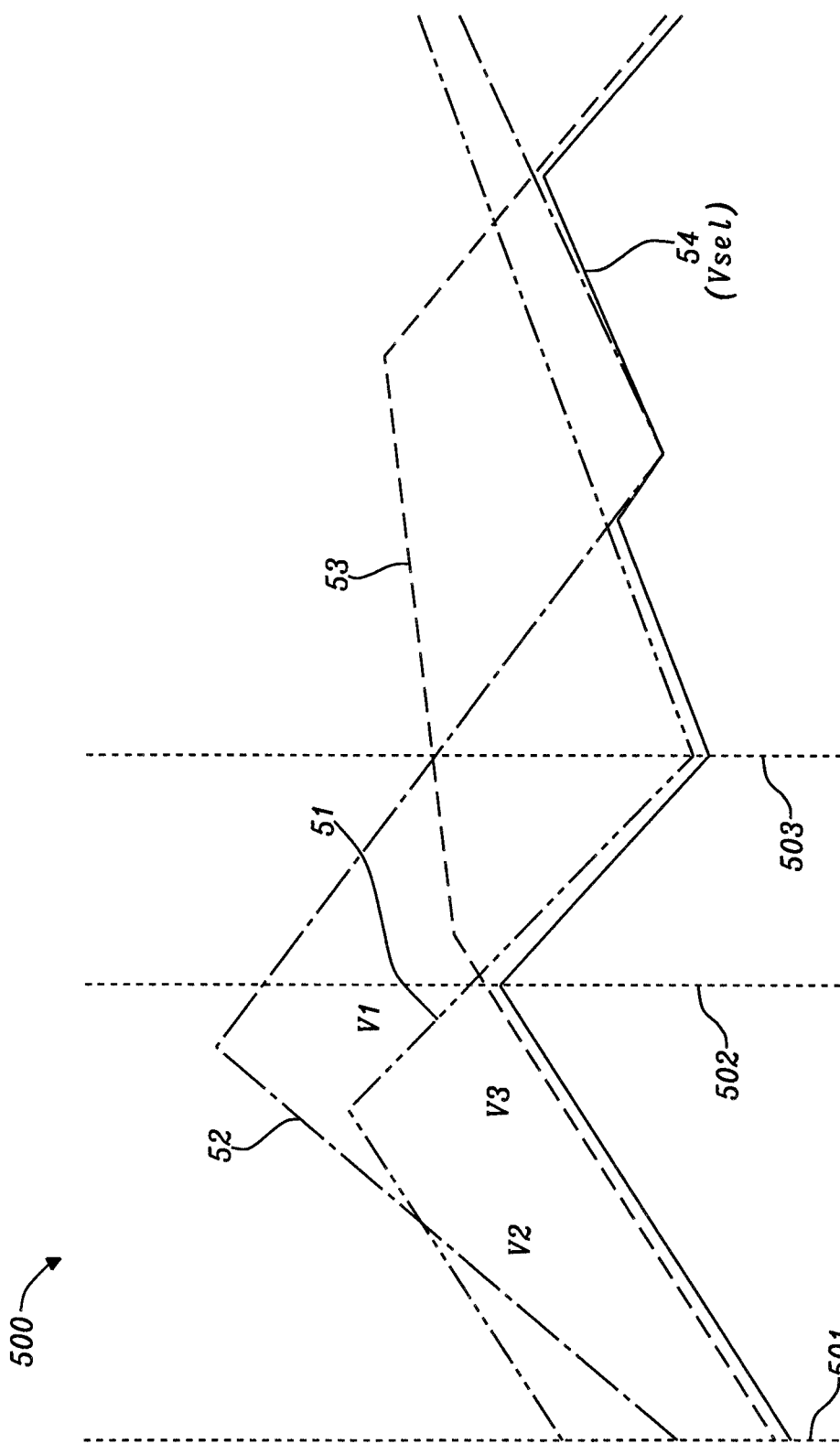
FIG. 5 shows signal waveforms of exemplary error voltages within a DC/DC converter.

To illustrate the impact of the selective clamping unit 405, FIG. 5 shows signal waveforms of exemplary error voltages within the DC/DC converter 201 in the direct charging architecture 200 without selective clamping unit 405 (see FIG. 2). FIG. 5 illustrates the voltage values of the first error voltage 51, the second error voltage 52 and the third error voltage 53 over time. From time 501 to time 502, the third error voltage 53 has the minimum value 54 (denoted as Vsel in FIG. 5). During this first time interval from time 501 to time 502, the third feedback loop is dominating the actual switching behavior of the switching elements. Subsequently, from time 502 to time 503, the first error voltage 51 has the minimum value 54. In other words, during this second time interval from time 502 to time 503, the first feedback loop is dominating the switching behavior of the DC/DC converter 201.

Figure 6:
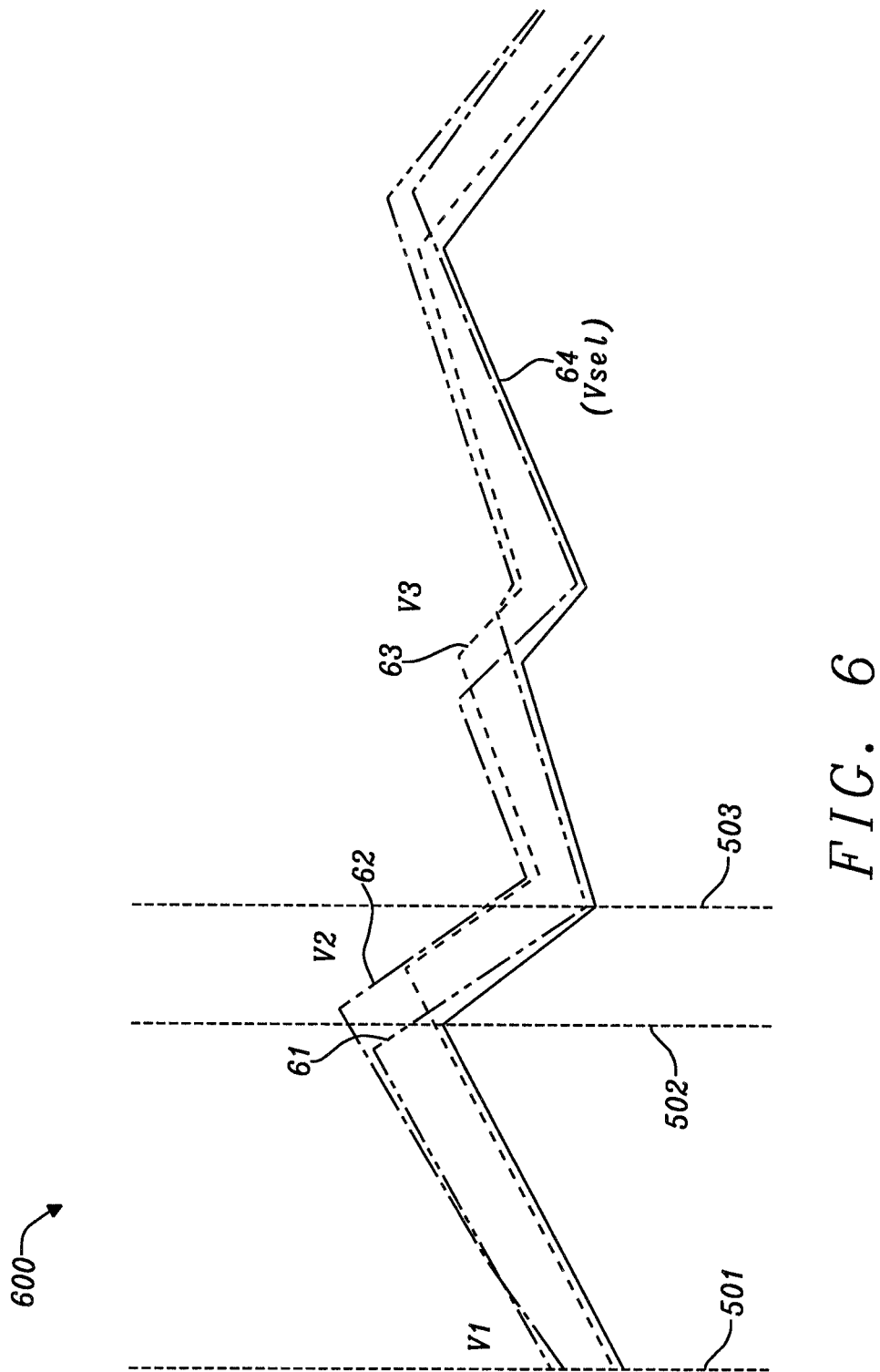
FIG. 6 shows further signal waveforms of exemplary error voltages within a DC/DC converter.

FIG. 6, in contrast, illustrates signal waveforms of exemplary error voltages within the DC/DC converter 401 in the direct charging architecture 400 with selective clamping unit 405 (see FIG. 4). Once more, FIG. 6 illustrates the voltage values of the first error voltage 61, the second error voltage 62, the third error voltage 63, and the minimum value 64 over time. This time, however, the selective clamping unit 405 determines that the first feedback circuit and the second feedback circuit are not-dominant during the first time interval, since their error voltages exceed the error voltage of the third feedback circuit. Therefore, the selective clamping unit 405 clamps the first error voltage 61 and the second error voltage 62 relative to the third error voltage 63, and thereby reduces the voltage values of the first error voltage 61 as well as the second error voltage 62. As can be seen in FIG. 6, the error voltages 61, 62, 63 of the three feedback circuits are closer to each other compared to the error voltages 51, 52, 53 depicted in FIG. 5. In this way, saturation of error voltages is prevented and the time required for switching between dominant feedback circuits is significantly reduced.

Figure 7:
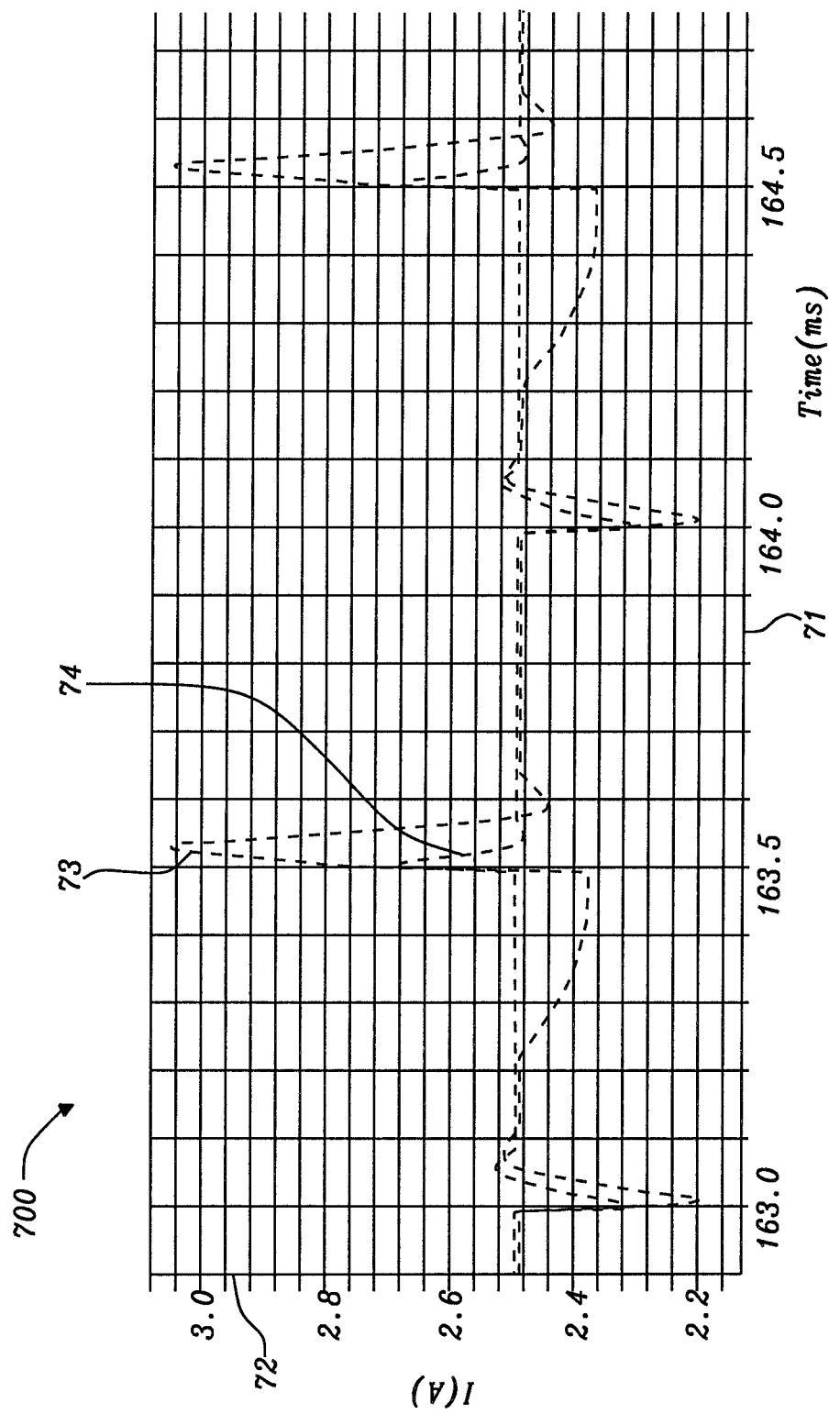
FIG. 7 shows simulation results for comparing the output currents of the DC/DC converters within the direct charging architectures.

FIG. 7 shows simulation results for comparing the output currents of the DC/DC converters 201 and 401 within the direct charging architectures 200 and 400 depicted in FIGS. 2 and 4, respectively. Both output currents are illustrated in a diagram with time 71 on the x-axis and current 72 on the y-axis. As can be seen in FIG. 7, the output current 74 of the DC/DC converter 401 (which is supported by the selective clamping unit 405) is substantially smoother than the output current 73 of the DC/DC converter 201. In fact, the selective clamping unit 405 reduces current overshoots due to the long time needed to desaturate error voltages when switching from a dominant feedback loop to a previously non-dominant feedback loop.

Figure 8:
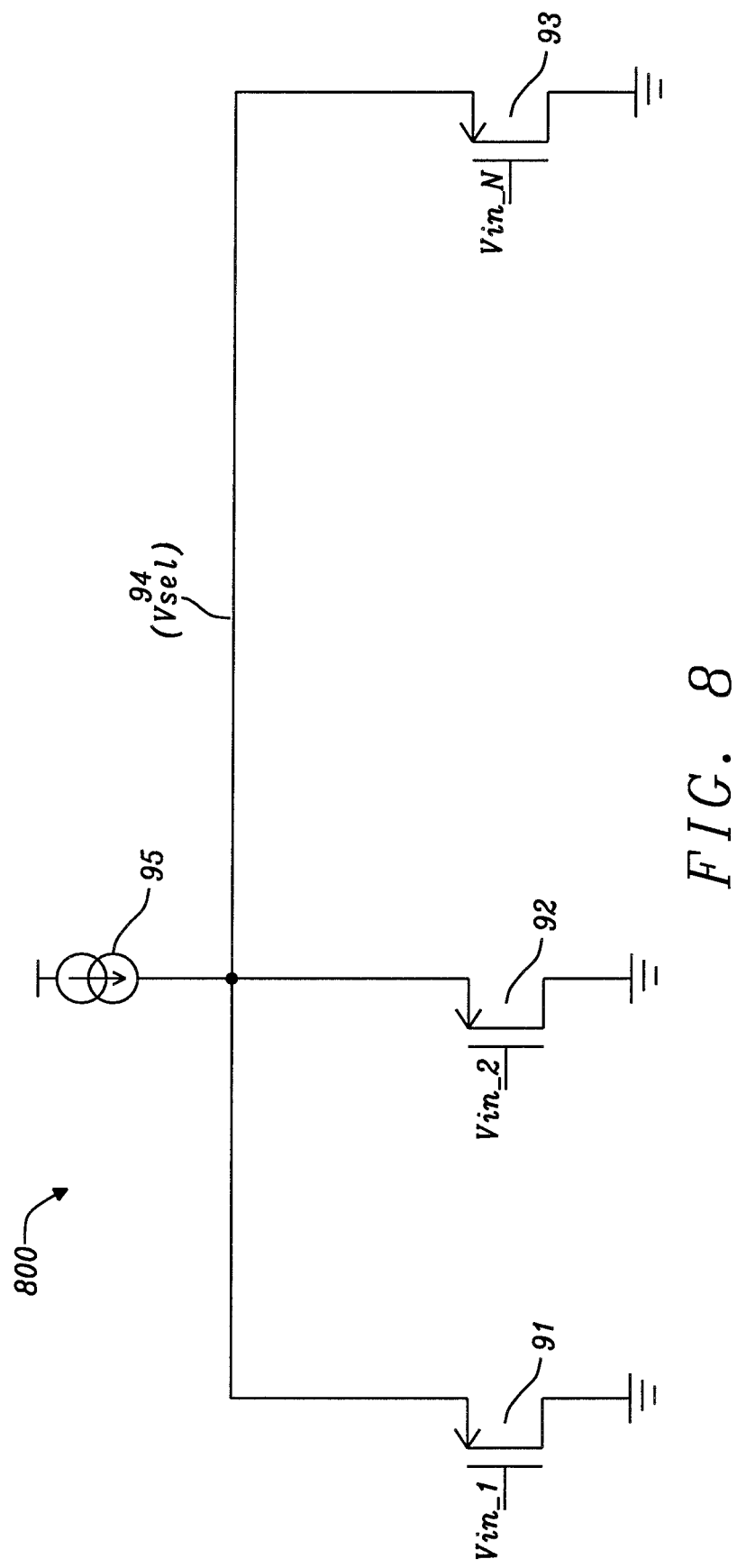
FIG. 8 shows an example circuit for determining the feedback circuit with the minimum error voltage.

FIG. 8 shows an example circuit for selecting the feedback circuit with the minimum error voltage. As discussed above, a lower error voltage means that it will cross the ramp voltage before the other error voltages, and the corresponding feedback circuit will dominate. In FIG. 8, current source 95 is connected via an intermediate node 94 with three transistors 91, 92, and 93. The error voltages Vin_1, Vin_2 to Vin_N are applied to the gates of the transistors. As a result, the minimum gate voltage among the gate voltages Vin_1, Vin_2 to Vin_N will determine the voltage Vsel at the intermediate node 94. As a result, the minimum voltage Vsel will differ from the minimum gate voltage only by the respective gate-source-voltage $V_{gs}$.

Figure 9:
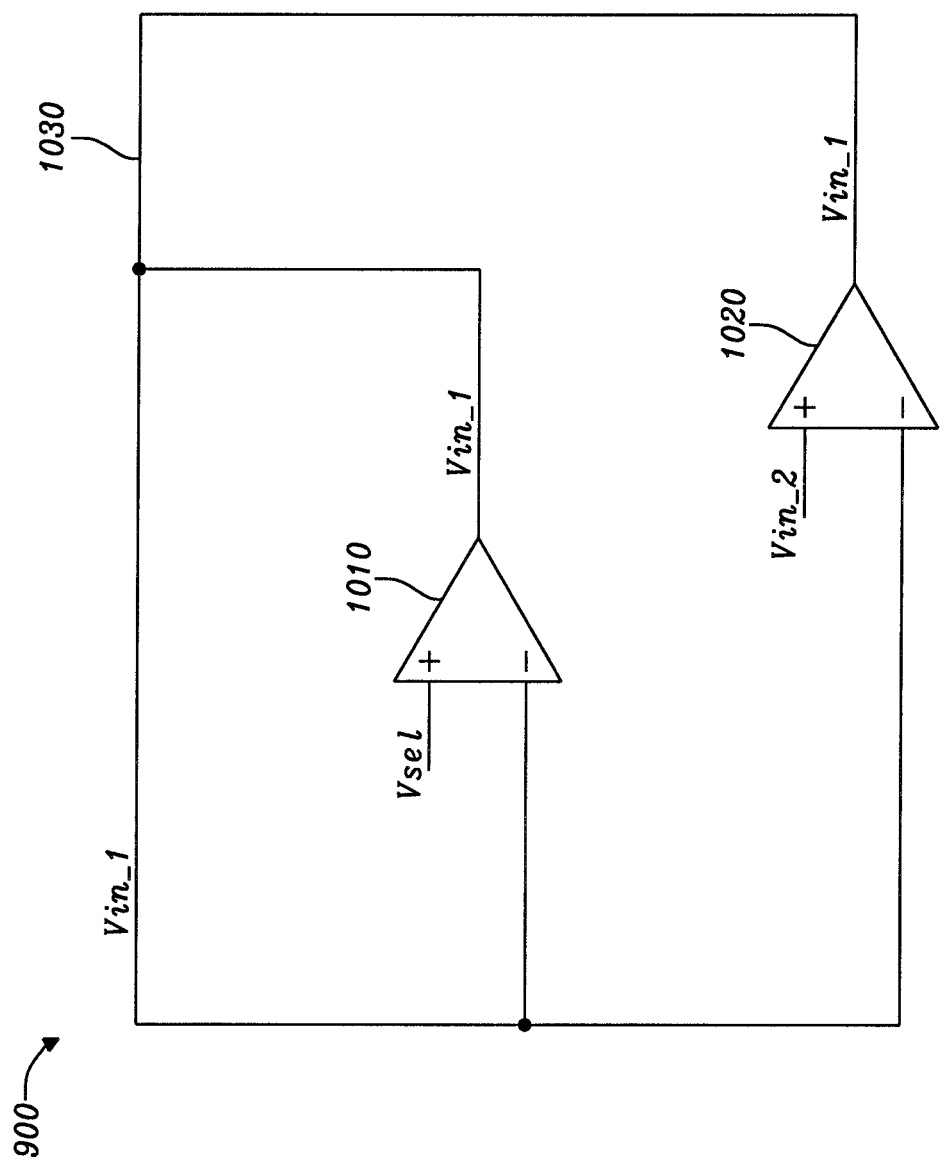
FIG. 9 shows an example circuit for clamping the error voltage in a feedback circuit.

FIG. 9 shows an example circuit for clamping the error voltage in a feedback circuit. Specifically, in the depicted example circuit, the two outputs of the two amplifiers 1010 and 1020 are coupled to the inverting inputs of both amplifiers 1010 and 1020 via a central node 1030. At the same time, the minimum voltage Vsel is applied to the non-inverting input of the first amplifier 1010, and a first error voltage Vin_2 is applied to the non-inverting input of the second amplifier 1020. Every feedback circuit may comprise one example circuit shown in FIG. 9.

Figure 10:
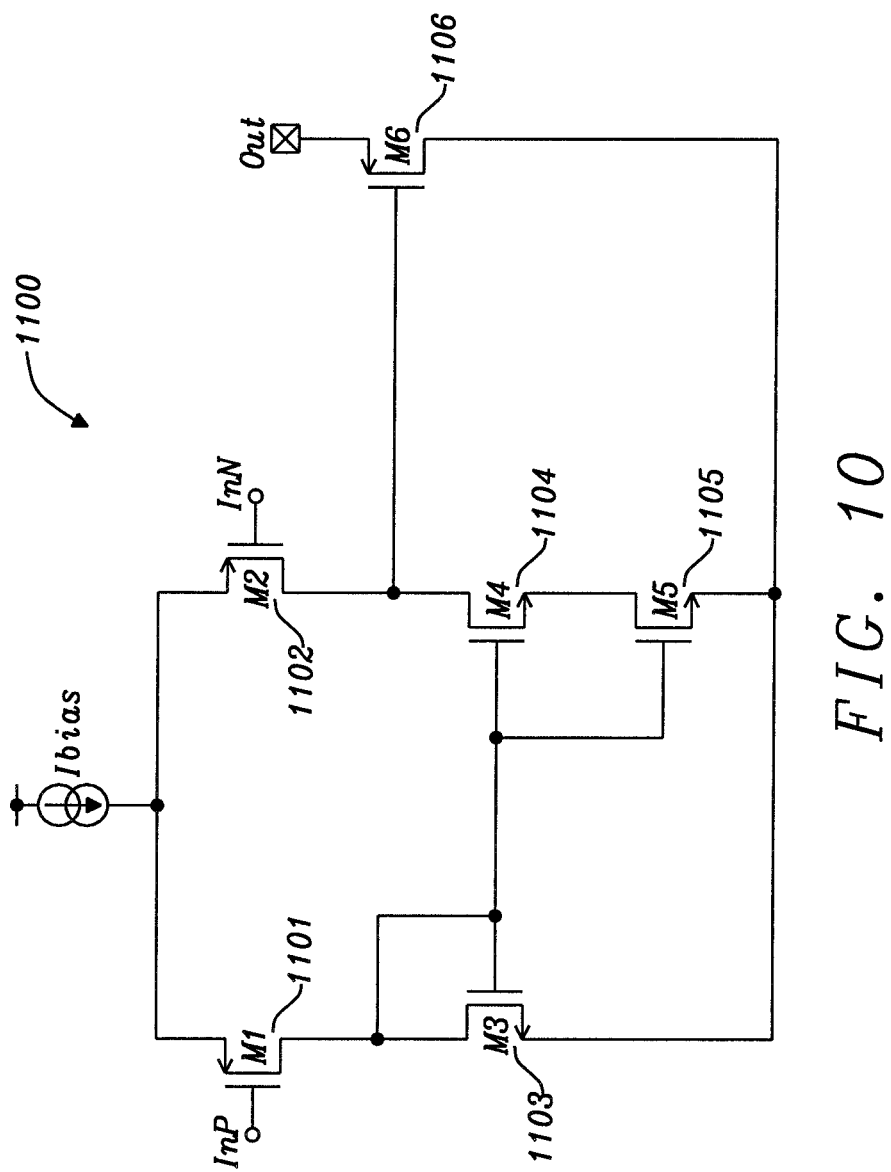
FIG. 10 shows an exemplary amplifier layout, for clamping the error voltage in a feedback circuit.

Finally, FIG. 10 shows an exemplary amplifier layout 1100 which may be used to implement the amplifiers 1010 and 1020 in FIG. 9. The amplifier layout 1100 comprises transistors 1101 and 1102, which form a differential input pair. Further, transistors 1103, 1104, and 1105 represent the active load. Specifically, the predetermined threshold voltage used for clamping the error voltages may be adjusted by dimensioning transistors 1104 and 1105 accordingly. Transistor 1106 M6 may have a low impedance, and may clamp the respective error voltage based on the predetermined threshold voltage determined by transistors 1104 and 1105.

Figure 11:
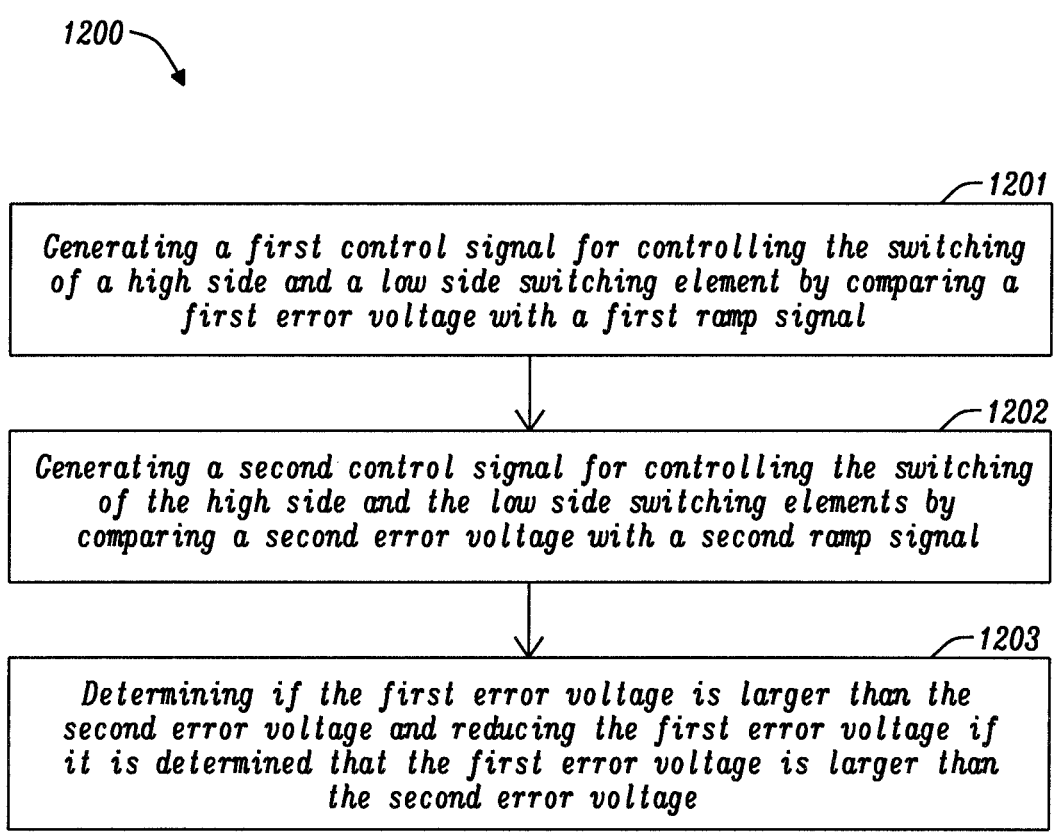
FIG. 11 shows a flowchart of a method for a feedback circuit, where the minimum error voltage is actively regulating the output voltage or the output current of the DC/DC converter.

FIG. 11 shows a flowchart of a method for a feedback circuit, where the minimum error voltage is actively regulating the output voltage or the output current of the DC/DC converter. The method 1200 comprises generating (step 1201) a first control signal for controlling the switching of a high side and a low side switching element by comparing a first error voltage with a first ramp signal. The method 1200 further comprises generating (step 1202) a second control signal for controlling the switching of the high side and the low side switching elements by comparing a second error voltage with a second ramp signal. Furthermore, the method 1200 comprises determining (step 1203) if the first error voltage is larger than the second error voltage and reducing the first error voltage if it is determined that the first error voltage is larger than the second error voltage.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter with
   a high side switching element and a low side switching element arranged in series between an input terminal of a power converter and a reference terminal;
   a first feedback circuit configured to control an output voltage or an output current at an output terminal of the power converter, said first feedback circuit comprising a first comparator configured to generate a first control signal for controlling the switching of said high side and said low side switching elements by comparing a first error voltage with a first ramp signal;
   a second feedback circuit configured to control said output voltage or said output current, the second feedback circuit comprising a second comparator configured to generate a second control signal by comparing a second error voltage with a second ramp signal; and
   a selective clamping unit configured to determine if the first error voltage is larger than the second error voltage, and to reduce the first error voltage if it is determined that the first error voltage is larger than the second error voltage.

2. The power converter of claim 1, wherein the selective clamping unit is configured to reduce the first error voltage if a voltage difference between the first error voltage and the second error voltage exceeds a predetermined threshold voltage.

3. The power converter of claim 1, further comprising a control circuit configured to generate a combined control signal for controlling the switching of said high side and said low side switching elements based on the second error voltage when the first error voltage is larger than the second error voltage.

4. The power converter of claim 3, wherein the control circuit further comprises a logic gate configured to generate the combined control signal based on the first control signal and the second control signal.

5. The power converter of claim 4, wherein the logic gate is an AND-gate.

6. The power converter of claim 1, wherein the first feedback circuit comprises a first error amplifier configured to generate the first error voltage by amplifying a difference between a first reference voltage and a first feedback voltage from the output of the power converter, and wherein the second feedback circuit comprises a second error amplifier configured to generate the second error voltage by amplifying a difference between a second reference voltage and a second feedback voltage from the output of the power converter.

7. The power converter of claim 1, wherein the first feedback circuit is configured to control the output current of the power converter, and wherein the second feedback circuit is configured to control the output voltage of the power converter.

8. The power converter of claim 7, wherein the first feedback circuit is configured to control the output current during a first time interval, and wherein the second feedback circuit is configured to control the output voltage during a subsequent, second time interval.

9. The power converter of claim 1, wherein both the first ramp signal and the second ramp signal are generated by the same ramp signal generator.

10. The power converter of claim 9, wherein the same ramp signal generator is configured to generate the first and the second ramp signal based on a voltage at an intermediate node connecting the high side switching element and the low side switching element.

11. A method for operating a power converter with a high side switching element and a low side switching element arranged in series between an input terminal of the power converter and a reference terminal, the method comprising:
generating a first control signal for controlling the switching of said high side and said low side switching elements by comparing a first error voltage with a first ramp signal;
generating a second control signal for controlling the switching of said high side and said low side switching elements by comparing a second error voltage with a second ramp signal;
determining if the first error voltage is larger than the second error voltage and reducing the first error voltage if it is determined that the first error voltage is larger than the second error voltage.

12. The method according to claim 11, wherein reducing the first error voltage comprises reducing the first error voltage if a voltage difference between the first error voltage and the second error voltage exceeds a predetermined threshold voltage.

13. The method according to claim 11, further comprising generating, by a control circuit, a combined control signal for controlling the switching of the switching element based on the second error voltage when the first error voltage is larger than the second error voltage.

14. The method according to claim 13, further comprising providing a logic gate within the control circuit, and
generating, by said logic gate, the combined control signal based on the first control signal and based on the second control signal.

15. The method according to claim 14, further comprising determining, by said logic gate, the combined control signal by performing a logical AND-operation on the first control signal and on the second control signal.

16. The method according to claim 11, further comprising providing, as part of the first feedback circuit, a first error amplifier,
generating, by said first error amplifier, the first error voltage by amplifying a difference between a first reference voltage and a first feedback voltage from the output of the power converter,
providing, as part of the second feedback circuit, a second error amplifier, and
generating, by said second error amplifier, the second error voltage by amplifying a difference between a second reference voltage and a second feedback voltage from the output of the power converter.

* * * * *